United States Patent
Attinella et al.

(10) Patent No.: US 8,245,002 B2
(45) Date of Patent: Aug. 14, 2012

(54) CALL STACK PROTECTION

(75) Inventors: John E Attinella, Rochester, MN (US);
Mark E Giampapa, Irvington, NY (US); Thomas M. Gooding, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 12/247,497

(22) Filed: Oct. 8, 2008

(65) Prior Publication Data

US 2010/0088705 A1    Apr. 8, 2010

(51) Int. Cl.
*G06F 12/14* (2006.01)
(52) U.S. Cl. ............... 711/163; 711/E12.096
(58) Field of Classification Search ........... 711/132
See application file for complete search history.

(56) References Cited

U.S. PATENT DOCUMENTS

| | | | |
|---|---|---|---|
| 5,950,221 A * | 9/1999 | Draves et al. | 711/100 |
| 6,826,675 B1 * | 11/2004 | Tormey et al. | 712/202 |
| 7,287,140 B1 * | 10/2007 | Asanovic et al. | 711/163 |
| 7,380,245 B1 * | 5/2008 | Lovette | 718/100 |
| 2004/0143824 A1 * | 7/2004 | Sarcar | 717/145 |
| 2005/0198464 A1 * | 9/2005 | Sokolov | 711/203 |
| 2006/0225134 A1 * | 10/2006 | Conti | 726/22 |
| 2007/0285271 A1 * | 12/2007 | Erlingsson et al. | 340/815.84 |
| 2008/0016305 A1 * | 1/2008 | Chen et al. | 711/163 |
| 2009/0150616 A1 * | 6/2009 | Finnie et al. | 711/132 |

OTHER PUBLICATIONS

Steve Kleiman et al. Programming with Threads. 1996. SunSoft Press. pp. 229-237.*
Yuanyuan Zhou et al. "Efficient and Flexible Architectural Support for Dynamic Monitoring." Mar. 2005. ACM. ACM Transactions on Architecture and Code Optimizations. vol. 2. pp. 3-33.*
William Stallings. Operating Systems. 2001. Prentice-Hall. pp. 135-138.*
Ulfar Erlingsson et al. "XFI: Software Guards for System Address Spaces." Nov. 2006. USENIX. OSDI '06.*
Bhuvan Middha et al. "MTSS: Multitask Stack Sharing for Embedded Systems." Jul. 2008. ACM. ACM Transactions on Embedded Computing SYstems. vol. 7. No. 4. Article 46.*

* cited by examiner

*Primary Examiner* — Kevin L Ellis
*Assistant Examiner* — Nathan N Sadler
(74) *Attorney, Agent, or Firm* — Biggers & Ohanian, LLP

(57) ABSTRACT

Call stack protection, including executing at least one application program on the one or more computer processors, including initializing threads of execution, each thread having a call stack, each call stack characterized by a separate guard area defining a maximum extent of the call stack, dispatching one of the threads of the process, including loading a guard area specification for the dispatched thread's call stack guard area from thread context storage into address comparison registers of a processor; determining by use of address comparison logic in dependence upon a guard area specification for the dispatched thread whether each access of memory by the dispatched thread is a precluded access of memory in the dispatched thread's call stack's guard area; and effecting by the address comparison logic an address comparison interrupt for each access of memory that is a precluded access of memory in the dispatched thread's guard area.

18 Claims, 5 Drawing Sheets

CALL STACK PROTECTION

BACKGROUND OF THE INVENTION

1. Field of the Invention

The field of the invention is data processing, or, more specifically, methods, apparatus, and products for call stack protection.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which large advances have been made is in memory management, including memory management in parallel computer systems with high performance compute nodes having little tolerance for TLB or cache misses. Such systems often includes, for example, advanced measures for call stack protection. A call stack is a data structure in computer memory that stores information about the active subroutines of a computer program. The active subroutines are those which have been called but have not yet completed execution by returning. This kind of stack is also known as a execution stack, control stack, function stack, or run-time stack, and is often shortened to just 'the stack.' In this specification, however, such a stack, for clarity of explanation, is generally referred to as a 'call stack.' Since the call stack is organized as a stack-type data structure, a calling routine pushes its return address—and optionally other information also—onto the stack, and a called subroutine, when it finishes, pops that return address off the call stack and transfers processor control to that address. If a called subroutine calls on to yet another subroutine, it will push its return address onto the call stack, and so on, with the information stacking up and unstacking, pushing and popping, as the application program dictates.

There is typically one call stack associated with each thread of a process. If the number of active subroutines grows very large or if large amounts of data are pushed onto the stack, then the storage occupied by the stack may spill into other areas of process storage which may be allocated for other uses such as the program heap space. Conversely, allocations of non-stack storage such as heap may inadvertently or maliciously be extended into the current stack space.

Many computer systems implement a guard mechanism to detect these types of conflicts. These guard mechanisms are implemented by inserting unmapped or un-accessible address ranges within the address translation tables for the process within the computing system. These additional mappings cause additional fragmentation of the address ranges within the translation table. Within a computing system, there is usually a hardware address translation mechanism containing a fixed number of address translation mappings, typically referred to as a Translation Look-aside Buffer, or 'TLB.' If an address being referenced is not in the TLB, a miss condition occurs in which the operating system must obtain the correct mapping from the table and load this into the TLB so that the hardware can translate the address. In computing systems where pages of storage are faulted in from disk, using TLB mappings to implement a guard area is sufficient since the additional performance penalty for the handling of additional TLB misses is small compared to the overall time to handle a page fault.

However, at large compute node counts in highly parallel systems, for example, a phenomenon call "OS Noise" becomes a dominate term and can steal significant performance from applications as random processor interrupts (such as TLB misses) steal cycles from the total peak performance of the system. Ultrascaling high performance computing systems, such as those that implement IBM's BlueGene architecture, have been carefully designed to avoid TLB misses entirely by statically allocating the TLB layout. Since no TLB misses will be taken, the traditional guard page mechanism cannot be implemented on these newer systems.

Another limitation with the traditional guard area implementations is that the granularity of the protection is typically limited to a multiple of the page size. Also the location of the guard area is typically fixed for the process, thereby not adapting to the changing memory usage within the process and not making the most efficient use of the available memory.

SUMMARY OF THE INVENTION

Methods, apparatus, and computer program products for call stack protection, implemented on one or more computer processors of a computer, each computer processor including address comparison registers whose contents specify a guard area, each computer processor further including address comparison logic operatively coupled to the address comparison registers, the computer including an operating system, including executing at least one application program on the one or more computer processors, including initializing by the operating system a process of execution for the application program, the process composed of one or more threads of execution, each thread having a call stack, each call stack characterized by a separate guard area defining a maximum extent of the call stack, each guard area composed of a range of computer memory addresses access to which is precluded, each guard area composed of a range of memory addresses separating each call stack from other memory, each guard area's range of memory addresses specified in context information for each thread; dispatching by the operating system onto the processor one of the threads of the process, including loading a guard area specification for the dispatched thread's call stack guard area from thread context storage into the address comparison registers of the processor; determining by the address comparison logic in dependence upon the dispatched thread's guard area specification whether each access of memory by the dispatched thread is a precluded access of memory in the guard area of the call stack for the dispatched thread; and effecting by the address comparison logic an address comparison interrupt for each access of memory that is a precluded access of memory in the dispatched thread's guard area.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
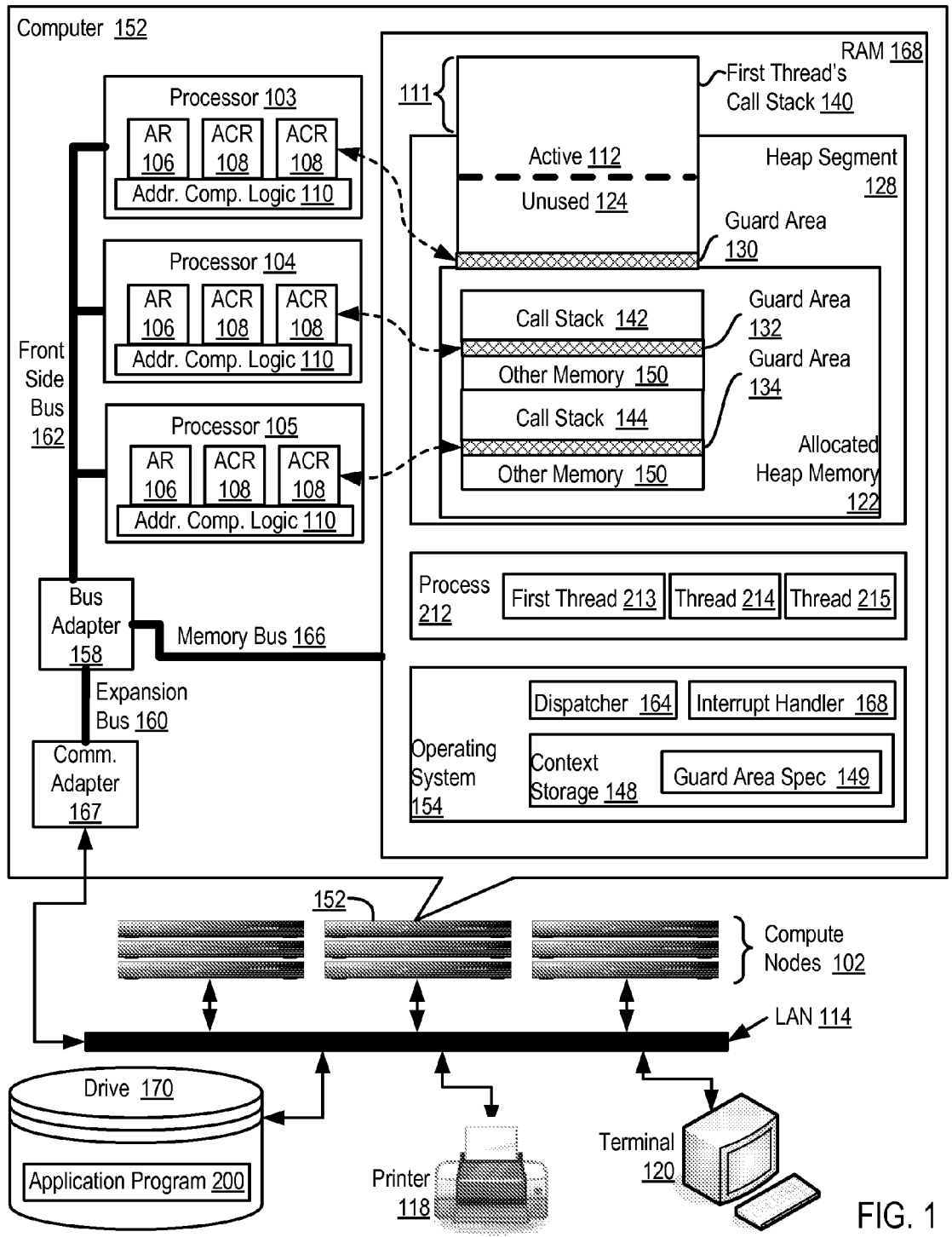
FIG. 1 sets forth a network diagram of a computer system that implements call stack protection according to embodiments of the present invention.

Exemplary methods, apparatus, and products for call stack protection in accordance with the present invention are described with reference to the accompanying drawings, beginning with FIG. 1. FIG. 1 sets forth a network diagram of a computer system that implements call stack protection according to embodiments of the present invention. The system of FIG. 1 includes several compute nodes (102) coupled together for data communications through a local area network (114). Each compute node is a computer in itself, each including one or more computer processors operatively coupled to computer memory so as to be capable of executing application programs. The system of FIG. 1 includes non-volatile memory for the computer in the form of data storage device (170), an output device for the computer in the form of printer (118), and an input/output device for the computer in the form of computer terminal (120). Stored on the data storage device (170) is an application program (200) to be executed on computer (152). The application program is a module of computer program instructions that carries out user-level data processing. To the extent that computer (152) functions as a compute node in a cluster of compute nodes organized for parallel operations, then application program (200) also represents a module of computer program instructions that carries out parallel, user-level data processing using parallel algorithms.

The compute nodes (102) in the example of FIG. 1 may be organized, for example, for parallel operations by use of the Message Passing Interface or 'MPI,' by use of the Parallel Virtual Machine or 'PVM' library, and in other ways as will occur to those of skill in the art. MPI and PVM are parallel communications libraries, modules of computer program instructions for data communications on parallel computers. MPI is promulgated by the MPI Forum, an open group with representatives from many organizations that define and maintain the MPI standard. PVM was developed by the University of Tennessee, The Oak Ridge National Laboratory, and Emory University. The example of FIG. 1 includes only nine compute nodes (102), but the number of compute nodes illustrated here is selected only for convenience of explanation, not as a limitation of the invention. A computer system that implements call stack protection according to embodiments of the present invention can include any number of compute nodes. BlueGene installations, for example, sometimes include thousands of compute nodes.

For further explanation, FIG. 1 includes an expanded functional block diagram of one compute node, computer (152), illustrating in some detail the internal structure and function of an example computer that implements call stack protection according to embodiments of the present invention. The particular internal architecture illustrated and discussed for computer (152) is an example for explanation. To the extent that computer (152) functions as a compute node in a cluster of compute nodes (102), the other compute nodes in the cluster may or may not have the same internal architecture as computer (152).

The example computer (152) of FIG. 1 includes several computer processors (103, 104, 105) or 'CPUs' as well as random access memory (168) ('RAM'), with the RAM connected through a high-speed memory bus (166), bus adapter (158), and a high-speed front side bus (162) to the processors (103, 104, 105) and to other components of the computer (152). Each computer processor (103, 104, 105) includes address comparison registers (108) whose contents specify a guard area (132, 134). Each computer processor includes an address register (106) in which is stored a memory address currently accessed by a processor. Each computer processor also includes address comparison logic (110) operatively coupled to address comparison registers (108) and to an address register (106). The address comparison logic is a network of synchronous or asynchronous logic configured to compare a memory address and a guard area specification to determine whether the memory address is inside a guard area.

Stored in RAM (168) in the example computer (152) of FIG. 1 is an operating system (154). Operating systems that may be improved to implement call stack protection according to embodiments of the present invention include, for example, UNIX™, Linux™, Microsoft XP™, AIX™, IBM's i5/OS™, and others as will occur to those of skill in the art. The operating system (154) in this example is shown in RAM (168), but readers will recognize that components of operating systems typically are stored in non-volatile memory also, such as, for example, on a disk drive (170).

In the example of FIG. 1, the computer (152) executes application program (200) on the one or more of its computer processors, with the executing application program represented internally in RAM by a process (212) of execution which in turn functions as a container for thread (213, 214, 215) of execution. The threads of execution are dispatched onto the processors by a dispatcher (164), a module of the operating system (154). Executing the application program includes the operating system's initializing a process (212) of execution for the application program so that each thread (213, 214, 215) of execution has a call stack (140, 142, 144).

The operating system also assigns to the process (212), a segment (128) of memory for use as heap memory, with the assigned heap memory segment (128) shared by threads (213, 214, 215) of the process (212). Heap memory is computer memory that is dynamically allocated at run time for use by a thread. In this example, a portion (122) of the assigned heap memory segment (128) has been allocated for use by one or more threads, and the remainder of the assigned heap memory segment (128) has not been allocated for use by any thread, although the active portion (112) of call stack (140) has had sufficient data 'pushed' upon it to encroach upon the unallocated portion of the assigned heap memory segment (128). In this specification, the term 'push,' depending on context, is typically used to refer to a computer program instruction that adds data to a call stack and expands the size of the stack by resetting a stack pointer to the new location in memory of the top of the stack after adding new data to the stack. Similarly, the term 'pop' as used in this specification generally refers to a computer program instruction that removes data from a stack, shrinks the size of the stack, and resets the stack pointer to specify the new top of the stack after data is removed from the stack.

Each call stack is characterized by a separate guard area (130, 132, 134) that defines a maximum extent of its call stack. Each guard area (130, 132, 134) is composed of a range of computer memory addresses access to which is precluded. Each guard area (130, 132, 134) includes a range of memory addresses that separates a call stack from other memory. Guard areas (132, 134) separate call stacks (142, 144) from other memory (150) within the allocated heap (122). Guard area (130) separates call stack (140) from the allocated heap memory (122).

Each guard area's range of memory addresses is specified in context information for each thread. A thread's context information is the contents of the architectural registers of the processor upon which the thread is executing. Architectural registers are registers of a processor that are accessible to software executing on the processor. Examples of architectural registers include accumulators, base registers, program counters, index registers for string operations, stack base pointers, top of stack pointers, instruction pointers, and so on. In this example, the architectural registers of computer (152) include address comparison registers (108) and address registers (106). Such context information, the contents of the architectural registers while a thread is executing on a processor, is stored in thread context storage (148), including the thread's guard area specification (149) from the address comparison registers (108), during any period of time when the thread is not dispatched upon a processor. When a thread that is dispatched for execution on a processor loses possession of the processor for any reason, the operating system (154), in particular, the dispatcher (164) of the operating system, stores the thread's guard area specification (149) from the address comparison registers (108) into thread context storage (148) for use on a next dispatch of the thread.

In the process of dispatching a thread onto a processor, the operating system loads, along with the thread's context information generally, a guard area specification (149) for the dispatched thread's call stack guard area from thread context storage (148) into the address comparison registers (108) of the processor. Then, for each access of memory by a dispatched thread (214), the address comparison logic (110) determines in dependence upon the dispatched thread's guard area specification (149) whether the access of memory is a precluded access of memory inside the guard area (132) of the call stack (142) for the dispatched thread (214). The address comparison logic determines whether an access is a precluded memory access by comparing the memory address currently in the memory address register (106) and a guard area specification from the address comparison registers (108) to determine whether the memory address is inside the guard area specified by the guard area specification.

For each access of memory that is a precluded access of memory inside the dispatched thread's guard area (132), the address comparison logic (110) effects an address comparison interrupt. The address comparison logic (110) effects an address comparison interrupt by, for example, submitting a vectored interrupt into an interrupt handler in the operating system that forwards or 'vectors' the interrupt to a specific interrupt handling subroutine that administers address comparison interrupts. An interrupt handling subroutine for address comparison interrupts is a module of computer program instructions that can administer an address comparison interrupt by, for example, recording a state of the processor at the time of the interrupt and then terminating the process, that is, terminating execution of all threads of the process and deleting the operating system data structures and data values that implement the process. Recording the state of the processor means recording the values in the architectural registers of the processor at the time when the address comparison interrupt occurs, thereby giving a programmer an opportunity to use that information to correct the condition that caused the address comparison interrupt, that is, the opportunity to correct the condition that caused an incorrect attempt to access memory inside a guard area.

Recording processor state and terminating the process is deemed an optional alternative method of administering an address comparison interrupt. Alternative processing for address comparison interrupts includes, for example, freeing memory previously assigned to a call stack (140) outside the region of allocated heap memory (122), thereby converting that memory into memory available for heap allocation, and subsequently allocating heap memory for use by the thread whose call stack memory was freed. Effecting an address comparison interrupt may also be carried out, for a further alternative example, by freeing memory previously assigned to a call stack (140) outside the region of allocated heap memory (122), thereby converting that memory into memory available for heap allocation, and subsequently moving the contents of the freed thread's call stack to a previously reserved, larger, separate segment of memory outside the assigned heap segment (128). The methods for effecting an address comparison interrupt recited above are included for illustrative purposes only, as an address comparison interrupt can be effected and processed in any manner that would occur to those of skill in the art.

In initializing the process (212), the operating system may initialize a first thread (213) of the process, including assigning for use as the first thread's call stack (140) memory outside the segment (128) of memory assigned to be used as heap memory. The operating system then may initialize the guard area specification for the guard area (130) of the first thread's call stack (140) so as to locate the guard area (130) of the first thread's call stack (140) adjacent to allocated heap memory (122). The first thread (213) may then create other threads (214, 215) of the process (212), including allocating for each of the other threads heap memory for use as a call stack (142, 144) and a guard area (132, 134).

The application program (200), or more particularly, threads of the process for the application program, may allocate heap memory so that the allocated (122) heap memory grows through such allocating toward an outside call stack (140), that is, a call stack (140) located outside the allocated heap memory (122) in computer memory space. The guard area specification for the guard (130) area of such an 'outside' call stack in this example defines the location of the guard area (130) of the outside call stack (140) outside the allocated heap memory (122) at the edge of the allocated heap memory nearest the outside call stack. The outside call stack (140) grows toward the allocated heap memory (122) through pushes of application data onto the outside call stack. Thus the guard area (130) is adjacent to the top of the allocated heap memory (122), and, when allocating additional heap memory, an allocation routine, malloc( ) for example, modifies the guard area specification (149) for the outside stack's guard area so as to move the outside call stack's guard area (130) toward the outside call stack (140) far enough in computer memory to accommodate the allocated heap memory.

To the extent that a first thread's outside call stack (140) has a guard area (130) adjacent to the top of the allocated heap memory (122), all allocations of heap memory grow the allocated heap toward the outside call stack (140) and toward the outside call stack's guard area (130), an area of memory in which access is precluded. As described above, when a first thread (213) having an outside call stack (140) allocates heap memory, malloc( ) can track the fact of the location of the outside call stack and take steps to relocate the guard area (130) adjacent to the top of the allocated heap (122). For allocations of heap memory by 'other' or 'second' threads (214, 215) having their call stacks (142, 144) inside allocated heap memory (122), however, the first thread (213) has no way of knowing of the need to move its call stack's guard area (130) when other, second, threads allocate heap memory. In the example of FIG. 1, therefore, when a second thread (214, 215), a thread having a call stack (142, 144) inside allocated heap memory, allocates heap memory, the second thread notifies the first thread (213) of the second thread's allocation of heap memory. The first thread then determines whether the first thread can move its call stack's guard area (130) far enough in computer memory to accommodate the second thread's allocating of heap memory. In this particular example, with unused stack memory (124) available inside the assigned heap memory segment (128), the first thread could move its call stack's guard area if the unused stack memory (124) were larger in size than a proposed allocation of heap memory by a second thread. In this example, if the first thread (213) cannot move its call stack's guard area (130) far enough in computer memory to accommodate the second thread's allocation of heap memory, the first thread kills its process of execution, treating the memory conflict as a fatal error. If the first thread (213) can move its call stack's guard area (130) far enough in computer memory to accommodate the second thread's allocation of heap memory, the first thread modifies the guard area specification (149) for the outside stack's guard area so as to move the outside call stack's guard area toward the outside call stack far enough in computer memory to accommodate the second thread's allocation of heap memory.

The example computer (152) of FIG. 1 includes a communications adapter (167), coupled through expansion bus (160) and bus adapter (158) to the processors (103, 104, 105) and other components of the computer (152), for data communications with other computers and for data communications with a data communications network, in this example, local area network (114). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that implement call stack protection according to embodiments of the present invention include modems for wired dial-up communications, Ethernet (IEEE 802.3) adapters for wired data communications network communications, and 802.11 adapters for wireless data communications network communications.

The arrangement of compute nodes (102), the network (114), and the I/O devices (170, 118, 120) making up the example system illustrated in FIG. 1 are for explanation, not for limitation. Data processing systems that implement call stack protection according to various embodiments of the present invention may include additional computers, servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
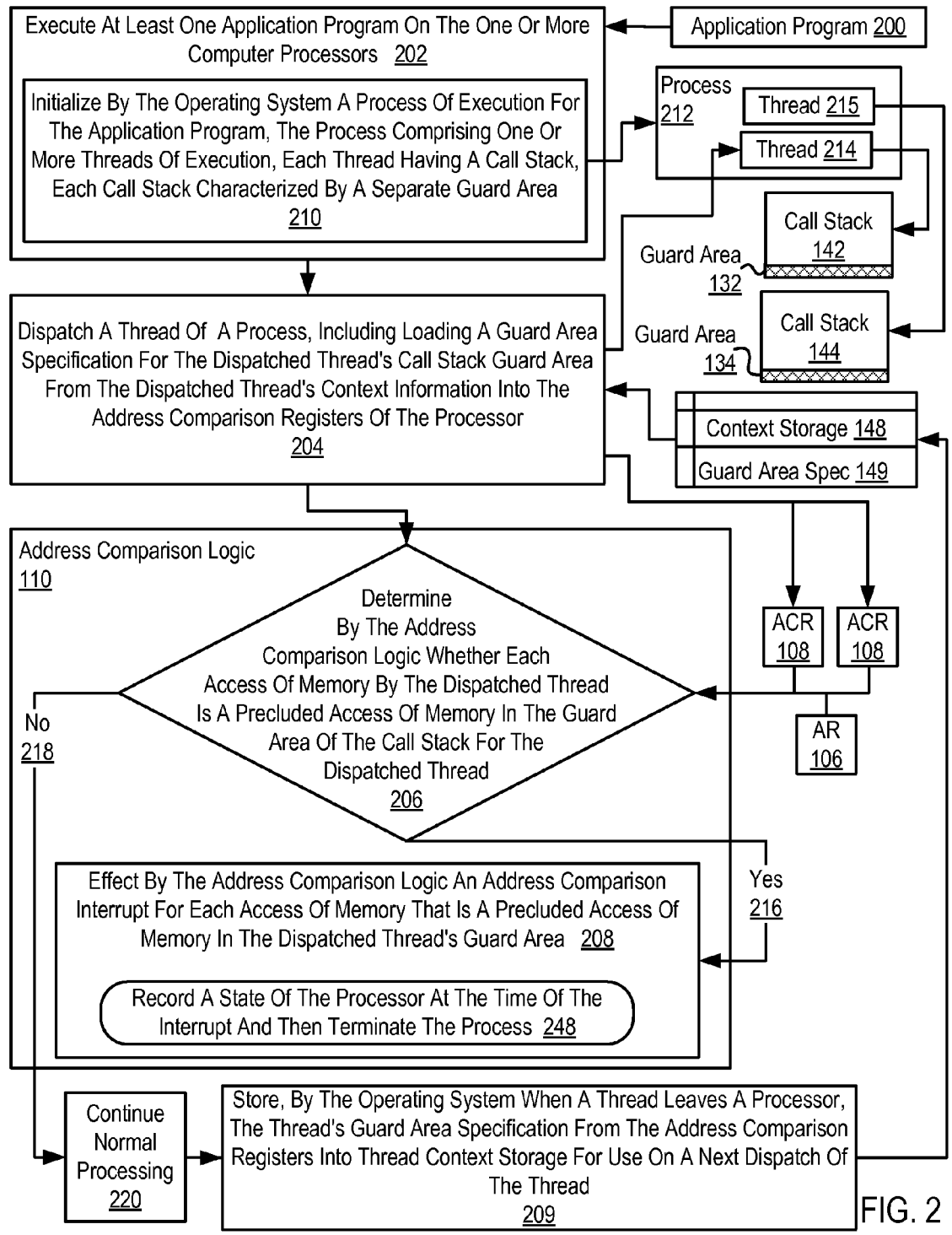
FIG. 2 sets forth a flow chart illustrating an example method of call stack protection according to embodiments of the present invention.

For further explanation, FIG. 2 sets forth a flow chart illustrating an example method of call stack protection according to embodiments of the present invention. The method of FIG. 2 is implemented on one or more computer processors of a computer similar to the computer (152) described and illustrated above in this specification with regard to FIG. 1. In such a computer, each computer processor (103, 104, 105 on FIG. 1) includes address comparison registers (108) whose contents specify a guard area (132, 134), and each computer processor includes address comparison logic (110) operatively coupled to the address comparison registers (108).

The method of FIG. 2 includes executing (202) at least one application program (200) on the one or more computer processors. Executing an application program according to the method of FIG. 2 includes initializing (210) by an operating system a process (212) of execution for the application program. The process in turn is composed of one or more threads (214, 215) of execution. Each thread has a call stack (142, 144), and each call stack is characterized by a separate guard area (132, 134). Each guard area, by its placement in memory, defines a maximum extent of a call stack. Each guard area includes a range of computer memory addresses access to which is precluded. Each guard area is composed of a range of memory addresses that separates a call stack from other memory, and each guard area's range of memory addresses is specified in context information for each thread. A thread's context information is the contents of the architectural registers of the processor upon which the thread is executing. Such context information is stored in thread context storage (148) during any period of time when a thread is not dispatched upon a processor.

The method of FIG. 2 includes dispatching (204) by an operating system onto a processor one of the threads (214) of the process. In dispatching the thread, a dispatching function of the operating system loads the dispatched thread's context information into the architectural registers of the processor and turns operation of the processor over to the dispatched thread for a period of time. The thread may lose possession of the processor by, for example, timing out, by interrupt, by forced termination of the thread, and in other ways that will occur to those of skill in the art. In the example of FIG. 2, dispatching the thread also includes loading a guard area specification (149) for the dispatched thread's call stack guard area from thread context storage (148) into the address comparison registers (108) of the processor. That is, the address comparison registers are part of the architectural register set of the processor, and loading a thread's context from context storage into the architectural registers of the processor includes loading the thread's guard area specification.

In the method of FIG. 2, the address comparison logic (110) determines (206), in dependence upon the dispatched thread's guard area specification (149), whether each access of memory by the dispatched thread (214) is a precluded access of memory in the guard area (132) of the call stack (142) for the dispatched thread (214). Any access to memory addresses inside the guard area (132) is a precluded access. The determination whether an access to memory is a precluded access is carried out in dependence upon the information contained in the address comparison registers (108) and the address register (106). The address register (106) contains the virtual memory address of the location in virtual memory presently being accessed by a thread of the application program. The access to memory can be from any thread of execution dispatched on any processor of the computer. The address comparison registers (108) contain the pertinent guard area specification. The guard area specification can take a number of alternative forms, including, for example, a direct specification of a precluded range of addresses with one limit of the range in one address comparison register and the other limit of the range in another address comparison register. The specification can also take the form of a limit and a mask with one limit of the range in one address comparison register and the mask in the other address comparison register. In the example of the two limits of a range, the address comparison logic determines whether an access is precluded by determining whether the address is within the range. In the example of a low limit with a mask, the address comparison logic performs a logical AND operation using the requested address and the mask as inputs. The address comparison logic (110) compares the result of the logical AND operation to the address contained in the address comparison register, and the address comparison logic determines that a requested access of memory is precluded if the result of the logical AND operation matches the address contained in the address comparison register. In another example method of determining whether an access is a precluded access of memory inside a guard area, a guard area specification may be composed of a single memory address that specifies a guard area composed of only a single memory address, and, in such an example, determining whether an access is precluded may be carried out by determining whether an access is an access to that single memory address. Other types of guard area specification may occur to those of skill in the art, and all such types are within the scope of the present invention.

For each access of memory that is determined to be a precluded access of memory (216) inside the dispatched thread's guard area (132), the method of FIG. 2 includes effecting (208) by the address comparison logic (110) an address comparison interrupt. Effecting (208) an address comparison interrupt may be carried out, for example, by submitting a vectored interrupt to an interrupt handler (168 on FIG. 1) in the operating system that forwards or 'vectors' the interrupt to an interrupt handling subroutine for address comparison interrupts. An interrupt handling subroutine for address comparison interrupts is a module of computer program instructions that can halt the execution of the dispatched thread, record debug information, terminate the currently running process, or initiate other action appropriate for handling address comparison interrupts as will occur to those of skill in the art.

In the method of FIG. 2, effecting (208) an address comparison interrupt optionally is carried out by recording (248) a state of the processor at the time of the interrupt and then terminating the process. Recording the state of the processor provides information for use in debugging the software that attempted to write or read from precluded memory. The recording can be in the form of a dump of all the values in the architectural registers of the processor to computer memory, to a printer, to an email, or to any form of recording, electronic or hardcopy, as may occur to those of skill in the art. Recording the processor state and terminating the process is described as optional because any kind of interrupt processing for precluded accesses is within the scope of the present invention. Alternative interrupt processing for memory comparison interrupts includes, for example, freeing the first thread's call stack, thereby converting the memory that previously contained the first thread's call stack into memory available for heap allocation, and subsequently allocating heap memory for use as the first thread's call stack. Effecting an address comparison interrupt may also be carried out, for a further alternative example, by freeing the first thread's call stack, thereby converting the memory that previously contained the first thread's call stack into memory available for heap allocation, and subsequently moving the first thread's call stack to a previously reserved, larger, separate segment of memory. The methods for effecting an address comparison interrupt recited above are included for illustrative purposes only, as an address comparison interrupt can be effected and processed in any manner that would occur to those of skill in the art.

For accesses of memory by threads of the application program that are not (218) precluded accesses, normal (220) processing continues. In the course of normal processing, each thread will eventually lose possession of the processor upon which the thread is dispatched. The thread may time out, suffer an interrupt from a higher priority thread, and so on. The method of FIG. 2 therefore includes storing (209), by the operating system when the dispatched thread (214) leaves the processor, the thread's guard area specification (149) from the address comparison registers (108) into thread context storage (148) for use on a next dispatch of the thread (214). When the thread loses possession of the processor, all the thread's context information, that is, all the data in the architectural registers of the processor, instruction register, program counter, stack base pointer, current stack pointer, and so on, are all placed in thread context storage, with the guard area specification from the address comparison register now included within the context information generally. When the thread leaving the processor is subsequently dispatched again to execute on the processor, the thread's entire context is restored to the processor's architectural registers, including the thread's guard area specification (149) which is then placed in the address comparison registers.

Figure 3:
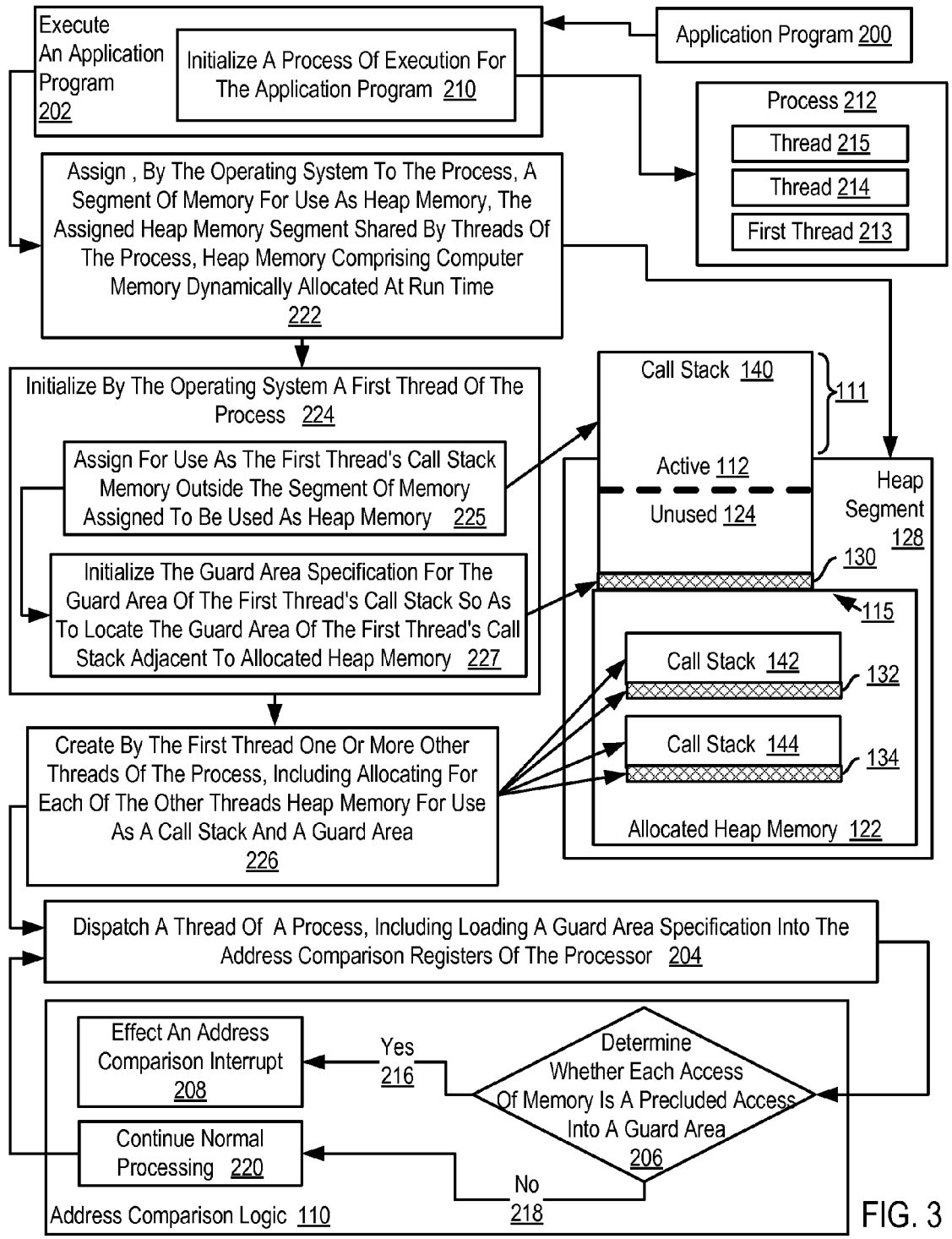
FIG. 3 sets forth a flow chart illustrating a further example method of call stack protection according to embodiments of the present invention.

For further explanation, FIG. 3 sets forth a flow chart illustrating an exemplary method of call stack protection according to embodiments of the present invention. The method of FIG. 3 is similar to the method of FIG. 2, including as it does executing (202) an application program, dispatching (204) a thread of execution, determining (206) whether an access of memory is precluded, and effecting (208) an address comparison interrupt, all of which operate as described above with reference to the method of FIG. 2. The method of FIG. 3, however, also includes assigning (222) by the operating system to the process (212) a segment (128) of memory for use as heap memory. The assigned heap memory segment (128) includes heap memory that is shared by all threads (213, 214, 215) of the process. Heap memory is computer memory dynamically allocated at run time at the behest of threads of execution. The amount of allocated heap memory (122) increases and decreases from time to time within the assigned heap memory segment (128) as threads of execution allocate and free heap memory at run time.

The method of FIG. 3 also includes an operating system's initializing (224) a first thread (213) of the process (212). In this example, initializing (224) the first thread includes assigning (225) for use as the first thread's call stack (140) memory (111) outside the segment (128) of memory assigned to be used as heap memory. Initializing (224) the first thread in this example also includes initializing (227) the guard area specification for the guard area (130) of the first thread's call stack (140) so as to locate the guard area (130) of the first thread's call stack adjacent to allocated heap memory (122). Locating the guard area (130) adjacent to allocated heap memory (122) means locating the guard area (130) right at the top (115) of the allocated heap memory (122). When the first thread (213) is first initialized, all of the active portion (112)

of the first thread's call stack, that is, all of the first thread's call stack memory occupied by data pushed onto the call stack, may be located entirely outside the assigned heap memory segment (128). As the first thread pushes data onto the call stack (140) at run time, however, the active portion (112) of the call stack grows, extending down in memory toward the allocated heap memory (122) inside the assigned heap memory segment (128), as shown in FIG. 3.

The method of FIG. 3 includes creating (226) by the first thread (213) one or more other threads (214, 215) of the process (212), including the first thread's allocating for each of the other threads (214, 215) heap memory for use as a call stack (142, 144) and a guard area (132, 134). The call stacks (142, 144) and guard areas (132, 134) for each thread (214, 215) created by the first thread (213) reside in allocated heap memory, whereas the call stack (140) and guard area (130) of the first thread reside outside the allocated heap memory (122). The location of the call stacks (142, 144) and guard areas (132, 134) for the threads (214, 215) created by the first thread (213) in allocated heap memory means that the guard areas (132, 134) for the threads (214, 215) created by the first thread (213) do not experience the repeated need to move their guard areas to accommodate allocations of heap memory that are experienced by the first thread's call stack guard area (130).

Figure 4:
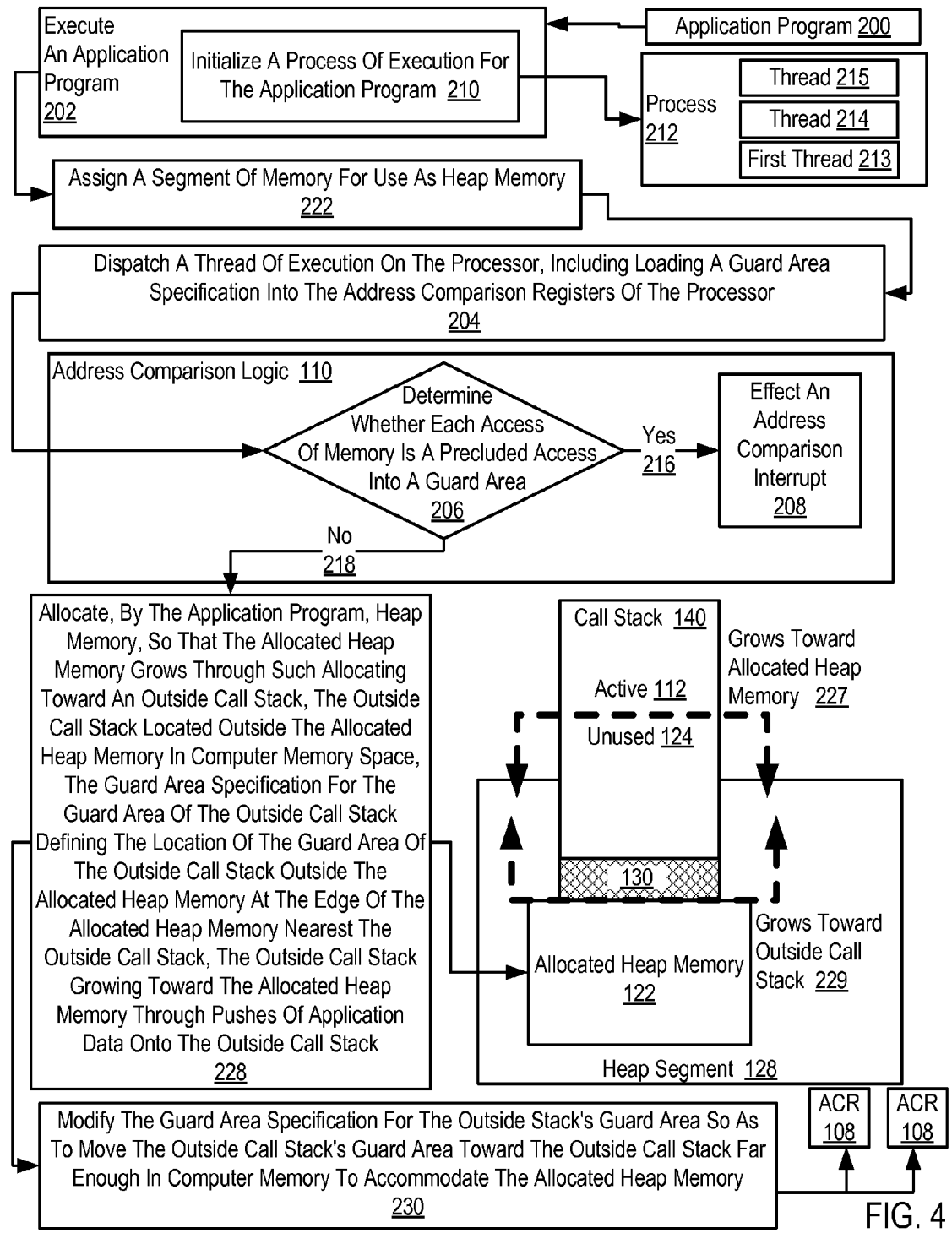
FIG. 4 sets forth a flow chart illustrating a further example method for call stack protection according to embodiments of the present invention.

For further explanation, FIG. 4 sets forth a flow chart illustrating a further exemplary method for call stack protection according to embodiments of the present invention. The method of FIG. 4 is similar to the methods of FIG. 2, including as it does executing (202) an application program, assigning (222) a segment of memory for use as heap memory, dispatching (204) a thread of execution, determining (206) whether an access of memory is precluded, and effecting (208) an address comparison interrupt, all of which operate as described above with reference to the method of FIG. 2. The method of FIG. 4, however, also includes the application program's allocating (228) heap memory so that the allocated (122) heap memory grows (229) through such allocating toward an outside call stack (140). That is, the threads of the application program allocate heap memory so that the allocated heap memory grows toward the outside call stack. The guard area specification for the guard (130) area of such an 'outside' call stack in this example defines the location of the guard area (130) of the outside call stack (140) outside the allocated heap memory (122) at the edge of the allocated heap memory nearest the outside call stack. Such an outside call stack (140) typically is the call stack for the first thread (213) of a process (212). The outside call stack grows (227) toward the allocated heap memory (122) through pushes of application data onto the outside call stack. Thus the guard area (130) is adjacent to the top of the allocated heap memory (122), and, when allocating additional heap memory, an allocation routine, malloc( ) for example, modifies the guard area specification (149) for the outside stack's guard area so as to move the outside call stack's guard area (130) toward the outside call stack (140) far enough in computer memory to accommodate the allocated heap memory.

The method of FIG. 4 includes modifying (230) the guard area specification for the outside stack's guard area so as to move the outside call stack's guard area toward the outside call stack far enough in computer memory to accommodate the allocated heap memory. Modifying (230) the guard area specification may be carried out in various ways depending on the structure of the guard area specification. Modifying (230) the guard area specification may be carried out for guard area specifications that are composed of memory bounds by changing the upper bound or lower bound of the range of precluded memory addresses which represent the guard area, that is, changing one or both of these bounds as they are stored in address comparison registers (108). Alternatively, for guard area specification based upon a mask, modifying (230) the guard area specification for the outside stack's guard area may be carried out by changing the mask used in defining the precluded memory addresses that represent the guard area, that is, changing the mask where it is stored in an address comparison register (108). Other methods for modifying the guard area specification for the outside stack's guard area may occur to those of skill in the art, and all such methods are within the scope of the present invention.

Figure 5:
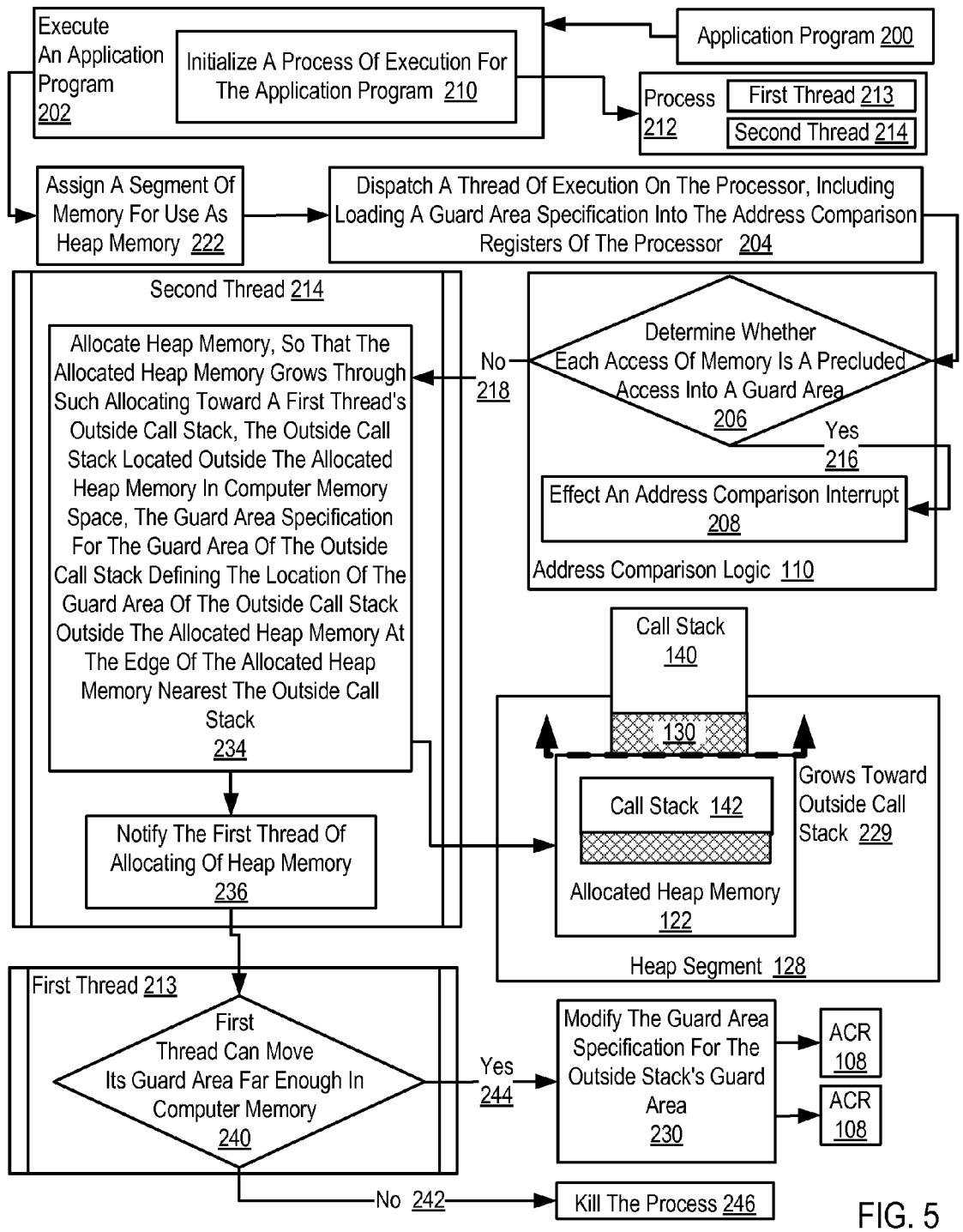
FIG. 5 sets forth a flow chart illustrating a further example method for call stack protection according to embodiments of the present invention.

For further explanation, FIG. 5 sets forth a flow chart illustrating an exemplary method for call stack protection according to embodiments of the present invention. The method of FIG. 5 is similar to the method of FIG. 2, including as it does executing (202) an application program, assigning (222) a segment of memory for use as heap memory, dispatching (204) a thread of execution, determining (206) whether an access of memory is precluded, and effecting (208) an address comparison interrupt, all of which operate as described above with reference to the method of FIG. 2.

The method of FIG. 5, however, is implemented with a first thread (213) of a process (212) where the first thread has a call stack (140) located in computer memory space outside the allocated heap memory (122) with a guard area (130) adjacent to the allocated heap memory, so that, when the allocated heap memory (122) grows through allocation, the guard area (130) of the outside call stack (140) moves toward the outside call stack to accommodate newly allocated heap memory. That is, the guard area specification for the guard area (130) of the outside call stack (140) defines the location of the guard area of the outside call stack outside the allocated heap memory at the edge of the allocated heap memory nearest the outside call stack. The method of FIG. 5 is also implemented with a second thread (214) having a call stack (142) located inside the allocated heap memory. When the second thread allocates (234) heap memory, the allocated heap memory (122) grows (229) through such allocating toward the first thread's outside call stack (140).

The method of FIG. 5 includes the second thread's notifying (236) the first thread (213) of the second thread's allocating heap memory. The second thread's notifying the first thread of the second thread's allocation of heap memory can be carried out, for example, by such methods of inter-process communication ('IPC') as Transmission Control Protocol ('TCP') connections implemented with sockets, pipes or named pipes, semaphores and shared memory segments, and other methods of IPC as may occur to those of skill in the art. Notifications from a second thread to a first thread typically include information specifying the allocation of heap memory, including, for example, the amount of heap memory to be allocated.

In the method of FIG. 5, the first thread determines (240) whether the first thread can move its guard area far enough in computer memory to accommodate the second thread's allocating of heap memory. In this particular example, if any portion of the first thread's call stack (140) is unused, the first thread could move its call stack's guard area (130) if the unused call stack memory were larger in size than a proposed allocation of heap memory by a second thread. In this example, if the first thread cannot (242) move its call stack's guard area (130) far enough in computer memory to accommodate the second thread's allocation of heap memory, the first thread kills (246) its process of execution, treating the memory conflict as a fatal error. If the first thread can (244) move its call stack's guard area (130) far enough in computer memory to accommodate the second thread's allocation of heap memory, the first thread modifies (230) the guard area specification for the outside stack's guard area so as to move the outside call stack's guard area (130) toward the outside call stack far enough in computer memory to accommodate the second thread's allocation of heap memory. Modifying the guard area specification for the outside stack's guard area can be carried out, for example, by changing the upper bound or lower bound of the range of precluded memory addresses which represent the guard area contained in the address comparison registers (108) of a processor.

In practice, there is within the scope of the present invention no particular timing requirement between a second thread's notifying of an allocation of heap memory and a first thread's determining whether the first thread can move its call stack's guard area to accommodate the allocation. A second thread (214) can wait for a first thread (213) to move its call stack's guard area (130) to continue processing, or a second thread can continue processing while a first thread moves its call stack's guard area. A malloc( ) routine of the second thread can, for example, block until the first thread moves its call stack's guard area, so that a normal return of the malloc( ) call effectively signals that the first thread successfully moved its call stack's guard area, and, if the first thread cannot move its call stack's guard area, the second thread will never know because the first thread kills the entire process, including killing the second thread, while the second thread's malloc( ) is still blocked.

In another embodiment, the second thread (214) advises a first thread (213) of the allocation by use of a non-blocking routine, so that a call to a routine that advises the first thread of a new allocation of heap memory returns immediately and processing continues in the second thread, regardless whether the first thread can move its call stack's guard area, even if the new allocation includes the first thread's call stack's guard area. In this embodiment that uses a non-blocking notification of a new allocation, if the first thread (213) cannot move its call stack's guard area (130) to accommodate an allocation of heap memory, again, the first thread can treat that failure as a fatal program error and kill the entire process—regardless of the fact that data processing continued in the second thread during the time required for the first thread to determine whether it could move its call stack's guard area (130). Also, if the first thread can move its call stack's guard area but the second thread attempts to access its newly allocated heap memory inside the guard area (130) before the first thread has time to move the guard area (130), the operating system may treat such an access as a fatal program error and kill the entire process (212), thereby killing all the threads of the process. If the first thread (213) can move its call stack's guard area (130) to accommodate such a new allocation of heap memory and succeeds in doing so before the second thread (214) attempts to access memory inside the guard area (130), then process execution among the threads continues normally. Thus are provided, by way of explanation rather than limitation, two illustrations of ways for a second thread (214) to notify a first thread (213) of an allocation of heap memory. Persons of skill in the art may identify other ways for a second thread to notify a first thread of an allocation of heap memory, and all such ways are within the scope of the present invention.

In view of the explanations set forth above, readers will recognize that the benefits of call stack protection according to embodiments of the present invention include:
   a stack guard implementation with a very low performance penalty when running in a high performance, non-page faulting environment, typical of highly parallel supercomputing systems or other simultaneous multi-processing ('SMP') systems.
   a separate guard area associated with a thread's call stack, with the guard area dynamically repositioned within the memory space to adapt to the changing memory allocations among threads of a process, allowing efficient usage of memory and the address space.

Exemplary embodiments of the present invention are described largely in the context of a fully functional computer system for call stack protection. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of call stack protection, the method implemented on one or more computer processors of a computer, each computer processor comprising address comparison registers whose contents specify a guard area, each computer processor further comprising address comparison logic operatively coupled to the address comparison registers, the computer comprising an operating system, the method comprising:
   executing at least one application program on the one or more computer processors, including initializing by the operating system a process of execution for the application program, the process comprising one or more threads of execution, each thread having a call stack, each call stack characterized by a separate guard area defining a maximum extent of the call stack, each guard area comprising a range of computer memory addresses access to which is precluded, each guard area comprising a range of memory addresses separating each call stack from other memory, each guard area's range of memory addresses specified in context information for each thread;
   dispatching by the operating system onto the processor one of the threads of the process, including loading a guard area specification for the dispatched thread's call stack guard area from thread context storage into the address comparison registers of the processor;

determining by the address comparison logic in dependence upon the dispatched thread's guard area specification whether each access of memory by the dispatched thread is a precluded access of memory in the guard area of the call stack for the dispatched thread; and effecting by the address comparison logic an address comparison interrupt for each access of memory that is a precluded access of memory in the dispatched thread's guard area.

2. The method of claim 1 further comprising:

assigning, by the operating system to the process, a segment of memory for use as heap memory, the assigned heap memory segment shared by threads of the process, heap memory comprising computer memory dynamically allocated at run time;

initializing by the operating system a first thread of the process, including assigning for use as the first thread's call stack memory outside the segment of memory assigned to be used as heap memory and initializing by the operating system the guard area specification for the guard area of the first thread's call stack so as to locate the guard area of the first thread's call stack adjacent to allocated heap memory; and creating by the first thread one or more other threads of the process, including allocating for each of the other threads heap memory for use as a call stack and a guard area.

3. The method of claim 1 further comprising:

assigning, by the operating system to the process, a segment of memory for use as heap memory, the assigned heap memory segment shared by threads of the process, heap memory comprising computer memory dynamically allocated at run time;

allocating, by the application program, heap memory, so that the allocated heap memory grows through such allocating toward an outside call stack, the outside call stack located outside the allocated heap memory in computer memory space, the guard area specification for the guard area of the outside call stack defining the location of the guard area of the outside call stack outside the allocated heap memory at the edge of the allocated heap memory nearest the outside call stack, the outside call stack growing toward the allocated heap memory through pushes of application data onto the outside call stack; and modifying the guard area specification for the outside stack's guard area so as to move the outside call stack's guard area toward the outside call stack far enough in computer memory to accommodate the allocated heap memory.

4. The method of claim 1 further comprising:

assigning, by the operating system to the process, a segment of memory for use as heap memory, the assigned heap memory segment shared by threads of the process, heap memory comprising computer memory dynamically allocated at run time;

allocating, by a second thread having a call stack located inside the heap, heap memory, so that the allocated heap memory grows through such allocating toward a first thread's outside call stack, the outside call stack located outside the allocated heap memory in computer memory space, the guard area specification for the guard area of the outside call stack defining the location of the guard area of the outside call stack outside the allocated heap memory at the edge of the allocated heap memory nearest the outside call stack, the allocating further comprising:

the second thread's notifying the first thread of the second thread's allocating of heap memory;

determining by the first thread whether the first thread can move its guard area far enough in computer memory to accommodate the second thread's allocating of heap memory;

if the first thread cannot move its guard area far enough in computer memory to accommodate the second thread's allocating of heap memory, killing the process; and if the first thread can move its guard area far enough in computer memory to accommodate the second thread's allocating of heap memory, modifying the guard area specification for the outside stack's guard area so as to move the outside call stack's guard area toward the outside call stack far enough in computer memory to accommodate the second thread's allocating of heap memory.

5. The method of claim 1 wherein effecting an address comparison interrupt further comprises recording a state of the processor at the time of the interrupt and then terminating the process.

6. The method of claim 1 further comprising storing, by the operating system when the dispatched thread leaves the processor, the thread's guard area specification from the address comparison registers into thread context storage for use on a next dispatch of the thread.

7. Apparatus for call stack protection, the apparatus comprising one or more computer processors and a computer memory operatively coupled to the computer processors, the computer memory having disposed within it computer program instructions, including an operating system, capable of:

executing at least one application program on the one or more computer processors, including initializing by the operating system a process of execution for the application program, the process comprising one or more threads of execution, each thread having a call stack, each call stack characterized by a separate guard area defining a maximum extent of the call stack, each guard area comprising a range of computer memory addresses access to which is precluded, each guard area comprising a range of memory addresses separating each call stack from other memory, each guard area's range of memory addresses specified in context information for each thread; and dispatching by the operating system onto the processor one of the threads of the process, including loading a guard area specification for the dispatched thread's call stack guard area from thread context storage into the address comparison registers of the processor;

each computer processor comprising address comparison registers whose contents specify a guard area, each computer processor further comprising address comparison logic operatively coupled to the address comparison registers, the address comparison logic configured to be capable of:

determining in dependence upon the dispatched thread's guard area specification whether each access of memory by the dispatched thread is a precluded access of memory in the guard area of the call stack for the dispatched thread; and effecting an address comparison interrupt for each access of memory that is a precluded access of memory in the dispatched thread's guard area.

8. The apparatus of claim 7 further comprising computer program instructions capable of:

assigning, by the operating system to the process, a segment of memory for use as heap memory, the assigned heap memory segment shared by threads of the process, heap memory comprising computer memory dynamically allocated at run time;

initializing by the operating system a first thread of the process, including assigning for use as the first thread's call stack memory outside the segment of memory assigned to be used as heap memory and initializing by the operating system the guard area specification for the guard area of the first thread's call stack so as to locate the guard area of the first thread's call stack adjacent to allocated heap memory; and creating by the first thread one or more other threads of the process, including allocating for each of the other threads heap memory for use as a call stack and a guard area.

9. The apparatus of claim 7 further comprising computer program instructions capable of:

assigning, by the operating system to the process, a segment of memory for use as heap memory, the assigned heap memory segment shared by threads of the process, heap memory comprising computer memory dynamically allocated at run time;

allocating, by the application program, heap memory, so that the allocated heap memory grows through such allocating toward an outside call stack, the outside call stack located outside the allocated heap memory in computer memory space, the guard area specification for the guard area of the outside call stack defining the location of the guard area of the outside call stack outside the allocated heap memory at the edge of the allocated heap memory nearest the outside call stack, the outside call stack growing toward the allocated heap memory through pushes of application data onto the outside call stack; and modifying the guard area specification for the outside stack's guard area so as to move the outside call stack's guard area toward the outside call stack far enough in computer memory to accommodate the allocated heap memory.

10. The apparatus of claim 7 further comprising computer program instructions capable of:

assigning, by the operating system to the process, a segment of memory for use as heap memory, the assigned heap memory segment shared by threads of the process, heap memory comprising computer memory dynamically allocated at run time;

allocating, by a second thread having a call stack located inside the heap, heap memory, so that the allocated heap memory grows through such allocating toward a first thread's outside call stack, the outside call stack located outside the allocated heap memory in computer memory space, the guard area specification for the guard area of the outside call stack defining the location of the guard area of the outside call stack outside the allocated heap memory at the edge of the allocated heap memory nearest the outside call stack, the allocating further comprising:

the second thread's notifying the first thread of the second thread's allocating of heap memory;

determining by the first thread whether the first thread can move its guard area far enough in computer memory to accommodate the second thread's allocating of heap memory;

if the first thread cannot move its guard area far enough in computer memory to accommodate the second thread's allocating of heap memory, killing the process; and if the first thread can move its guard area far enough in computer memory to accommodate the second thread's allocating of heap memory, modifying the guard area specification for the outside stack's guard area so as to move the outside call stack's guard area toward the outside call stack far enough in computer memory to accommodate the second thread's allocating of heap memory.

11. The apparatus of claim 7 wherein effecting an address comparison interrupt further comprises recording a state of the processor at the time of the interrupt and then terminating the process.

12. The apparatus of claim 7 further comprising computer program instructions capable of storing, by the operating system when the dispatched thread leaves the processor, the thread's guard area specification from the address comparison registers into thread context storage for use on a next dispatch of the thread.

13. A computer program product for call stack protection, the computer program product disposed in a computer readable, recordable storage medium, the computer program product comprising computer program instructions that include an operating system, the computer program instructions, when executed on a computer, capable of:

executing at least one application program on the one or more computer processors, including initializing by the operating system a process of execution for the application program, the process comprising one or more threads of execution, each thread having a call stack, each call stack characterized by a separate guard area defining a maximum extent of the call stack, each guard area comprising a range of computer memory addresses access to which is precluded, each guard area comprising a range of memory addresses separating each call stack from other memory, each guard area's range of memory addresses specified in context information for each thread; and dispatching by the operating system onto the processor one of the threads of the process, including loading a guard area specification for the dispatched thread's call stack guard area from thread context storage into the address comparison registers of the processor;

the computer comprising one or more computer processors, each computer processor comprising address comparison registers whose contents specify a guard area, each computer processor further comprising address comparison logic operatively coupled to the address comparison registers, the address comparison logic configured to be capable of:

determining in dependence upon the dispatched thread's guard area specification whether each access of memory by the dispatched thread is a precluded access of memory in the guard area of the call stack for the dispatched thread; and effecting an address comparison interrupt for each access of memory that is a precluded access of memory in the dispatched thread's guard area.

14. The computer program product of claim 13 further comprising computer program instructions capable of:

assigning, by the operating system to the process, a segment of memory for use as heap memory, the assigned heap memory segment shared by threads of the process, heap memory comprising computer memory dynamically allocated at run time;

initializing by the operating system a first thread of the process, including assigning for use as the first thread's call stack memory outside the segment of memory assigned to be used as heap memory and initializing by the operating system the guard area specification for the guard area of the first thread's call stack so as to locate the guard area of the first thread's call stack adjacent to allocated heap memory; and creating by the first thread one or more other threads of the process, including allocating for each of the other threads heap memory for use as a call stack and a guard area.

15. The computer program product of claim 13 further comprising computer program instructions capable of:

assigning, by the operating system to the process, a segment of memory for use as heap memory, the assigned heap memory segment shared by threads of the process, heap memory comprising computer memory dynamically allocated at run time;

allocating, by the application program, heap memory, so that the allocated heap memory grows through such allocating toward an outside call stack, the outside call stack located outside the allocated heap memory in computer memory space, the guard area specification for the guard area of the outside call stack defining the location of the guard area of the outside call stack outside the allocated heap memory at the edge of the allocated heap memory nearest the outside call stack, the outside call stack growing toward the allocated heap memory through pushes of application data onto the outside call stack; and modifying the guard area specification for the outside stack's guard area so as to move the outside call stack's guard area toward the outside call stack far enough in computer memory to accommodate the allocated heap memory.

16. The computer program product of claim 13 further comprising computer program instructions capable of:

assigning, by the operating system to the process, a segment of memory for use as heap memory, the assigned heap memory segment shared by threads of the process, heap memory comprising computer memory dynamically allocated at run time;

allocating, by a second thread having a call stack located inside the heap, heap memory, so that the allocated heap memory grows through such allocating toward a first thread's outside call stack, the outside call stack located outside the allocated heap memory in computer memory space, the guard area specification for the guard area of the outside call stack defining the location of the guard area of the outside call stack outside the allocated heap memory at the edge of the allocated heap memory nearest the outside call stack, the allocating further comprising:

the second thread's notifying the first thread of the second thread's allocating of heap memory;

determining by the first thread whether the first thread can move its guard area far enough in computer memory to accommodate the second thread's allocating of heap memory;

if the first thread cannot move its guard area far enough in computer memory to accommodate the second thread's allocating of heap memory, killing the process; and if the first thread can move its guard area far enough in computer memory to accommodate the second thread's allocating of heap memory, modifying the guard area specification for the outside stack's guard area so as to move the outside call stack's guard area toward the outside call stack far enough in computer memory to accommodate the second thread's allocating of heap memory.

17. The computer program product of claim 13 wherein effecting an address comparison interrupt further comprises recording a state of the processor at the time of the interrupt and then terminating the process.

18. The computer program product of claim 13 further comprising computer program instructions capable of storing, by the operating system when the dispatched thread leaves the processor, the thread's guard area specification from the address comparison registers into thread context storage for use on a next dispatch of the thread.

* * * * *